United States Patent [19]

Manfre' et al.

[11] 4,311,506
[45] Jan. 19, 1982

[54] METHOD AND APPARATUS FOR CONTINUOUSLY PRODUCING VERY SMALL DIAMETER METAL WIRE HAVING A GLASS COATING THEREOVER

[75] Inventors: Giovanni Manfre', Vinovo; Vittorio Pellegrini, Novara, both of Italy

[73] Assignee: Centro Ricerche Fiat S.p.A., Torino, Italy

[21] Appl. No.: 210,134

[22] Filed: Nov. 24, 1980

[30] Foreign Application Priority Data

Nov. 26, 1979 [IT] Italy .............................. 69273 A/79

[51] Int. Cl.³ .............................................. C03C 27/02
[52] U.S. Cl. ...................................... 65/59.6; 65/153; 65/154
[58] Field of Search ................... 65/59.31, 59.33, 59.6, 65/59.7, 153, 154

[56] References Cited

U.S. PATENT DOCUMENTS

| | | | |
|---|---|---|---|
| 1,104,054 | 7/1914 | Linder | 65/59.6 |
| 3,146,082 | 8/1964 | Hicks, Jr. et al. | 65/153 X |
| 3,287,097 | 11/1966 | Limpel | 65/153 X |
| 3,498,771 | 3/1970 | Bird et al. | 65/154 X |

Primary Examiner—Arthur D. Kellogg
Attorney, Agent, or Firm—Frost & Jacobs

[57] ABSTRACT

A method is described for continuously producing very small diameter metal wire from molten material, comprising at least one heating stage for heating in a first predetermined position a glass tube in which a wire of metal material is disposed, these being fed in the direction of their longitudinal axis in such a manner as to cause said glass to soften to a required viscosity and said material to melt in order to form a wire, and a cooling stage for cooling, in a second predetermined position, said wire on which a required traction is exerted; the method is characterised in that said second predetermined position, in which said wire cooling stage is carried out, is located, with respect to said first position, at such a location along the wire axis that solidification of said material takes place in a section situated not before the limiting section at which the reduction in cross-section of said wire terminates, the quantity of heat removed during said cooling stage being sufficiently high to prevent softening of the glass of said tube downstream of said limiting section.

25 Claims, 7 Drawing Figures

METHOD AND APPARATUS FOR CONTINUOUSLY PRODUCING VERY SMALL DIAMETER METAL WIRE HAVING A GLASS COATING THEREOVER

BACKGROUND OF THE INVENTION

This invention relates to a method for producing very small diameter metal wire from molten material, of the type in which the wire is obtained by exerting a suitable traction on the end of a glass tube which is adjusted to a viscosity suitable for simultaneous stretching with the metal which is disposed in its interior in the form of wire, powder etc. in the molten state.

Methods of this type are known to comprise at least one heating stage for heating, in a first determined position, a glass tube in which a wire of metal material is disposed, these being fed in the direction of their longitudinal axis in order to continuously give rise to softening of the glass to a required viscosity, and melting of the metal material in order to form a wire, and a cooling stage for cooling, in a second predetermined position, said wire on which a required traction force is exerted.

In this manner, as a result of the softening of the glass to the required viscosity and the melting of the metal material, the cross-section of the wire which forms from this gradually reduces due to the combined action of the temperature and of said traction force, until a wire is obtained having a diameter of the order of a thousandth of a millimeter or even less, and coated with a thin layer of glass.

Said heating stage is normally carried out by electroinduction and said cooling stage by the use of a suitable cooling fluid brought into contact with the wire under formation.

The described known methods have certain serious drawbacks. They cannot be carried out continuously because of the irregularities and frequent breakages which are produced in the wire under formation. In addition, the cooling rate of the wire is rather low and less than that required to obtain wires in the so-called "vitreous" state, i.e. with a substantially amphorous structure, from which favourable wire characteristics derive, as is known. Again, the temperature distribution along the axis of the glass tube and of the metal wire disposed in it, as obtainable by electroinduction heating, is not suitable for producing a uniform continuous wire formation. Finally the speed of formation of the wire is fairly low, and thus taking account of the high plant and operating costs necessary for carrying out the aforesaid methods, these are of little economical convenience.

SUMMARY OF THE INVENTION

The object of the present invention is to provide a method for producing very small diameter wire which is free from the aforesaid drawbacks.

The method of the invention, comprising at least one heating stage for heating in a first predetermined position a glass tube in which a wire of metal material is disposed, these being fed in the direction of their longitudinal axis in such a manner as to determine the softening of said glass to a required viscosity and the melting of said material in order to form a wire, and a cooling stage for cooling in a second predetermined position said wire on which a required traction is exerted, is characterised in that said second predetermined position in which said wire cooling stage is carried out is located, with respect to said first position, at such a location along the wire axis that the solidification of said material takes place in a section which is positioned not before the limiting section at which the reduction in cross-section of said wire terminates, the quantity of heat removed during said cooling stage being sufficiently high to prevent softening of the glass of said tube downstream of said limiting section.

A further object of the invention is to provide an apparatus for carrying out said method.

BRIEF DESCRIPTION OF THE DRAWINGS

The method and apparatus of the present invention will be more apparent from the detailed description given hereinafter with reference to the accompanying drawings in which.

DETAILED DESCRIPTION OF THE INVENTION

Figures 1, 2:
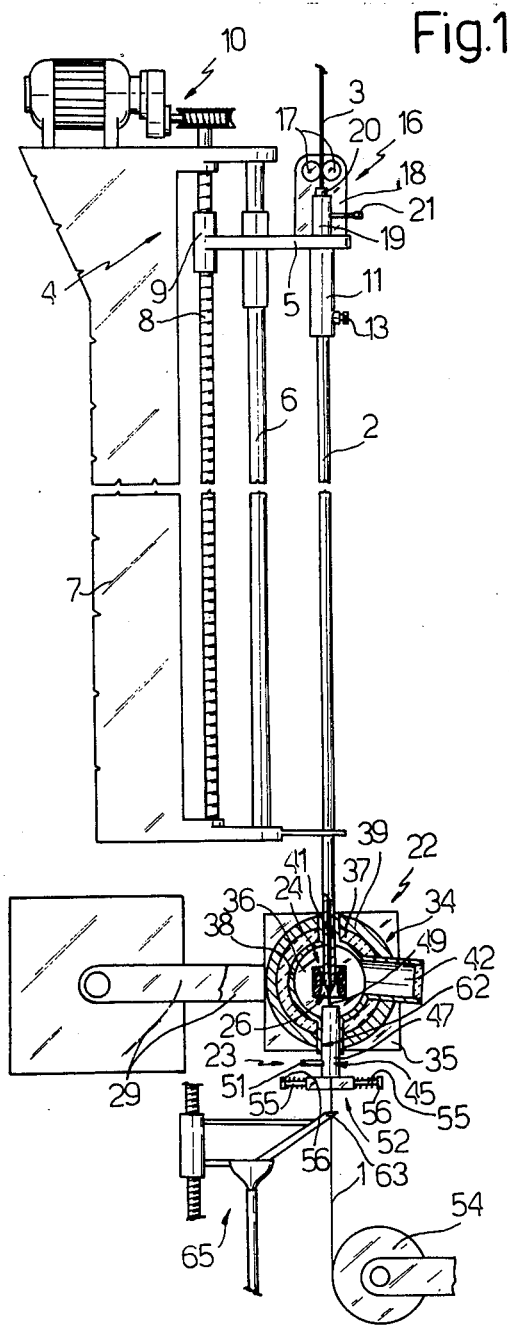
FIG. 1 is a partly sectional diagrammatic side view of one embodiment of the apparatus for carrying out the method of the invention.
FIG. 2 is a longitudinal section through an upper part of said apparatus.

The method of the invention is arranged to continuously produce a very small diameter metal wire, indicated by 1 in FIG. 1 as it leaves the apparatus at the end of the process. The method is of the type comprising at least one heating stage for heating, in a first predetermined position, a glass tube 2 and a wire of metal material 3 disposed in it, which are fed in the direction of their longitudinal axis in such a manner as to determine the softening of the glass to a required viscosity and the melting of the metal material, and a cooling stage for cooling in a second predetermined position the wire obtained while exerting on it a predetermined traction.

Before describing the method of the invention in detail, one embodiment of the equipment for carrying out the method and shown on the accompanying drawings will be described.

It comprises substantially first feed means for the glass tube 2, indicated overall by 4 (FIG. 1) and arranged to continuously feed the tube at a first predetermined speed, for example in a vertical direction. This can conveniently comprise a support frame 5 mobile vertically on a column 6 rigid with the equipment framework 7, by the action of a unit comprising a screw 8 and nut screw 9, this latter being rotatable on the framework itself and rotated by a suitable geared motor 10. The first feed means 4 also comprise a tubular element 11 (FIG. 2) connected to the support frame 5 and having its inner bore 12 arranged to receive the glass tube 2, which can be locked relative to the tubular element in any convenient manner, for example by means of a setscrew 13.

The apparatus also comprises second feed means 16 (FIGS. 1 and 2) for feeding the metal wire 3 inside the tube 2 and coaxially to it. These can conveniently comprise a pair of entrainment rollers 17 rotatable on a plate 18 carried by the support frame 5. These rollers are rotated in opposite directions in any convenient manner, and are kept in contact with the wire 3 under a predetermined pressure in order to axially feed it through the inside of the tube 2 at a second predetermined speed.

Inside the tubular element 11 there is inserted a sleeve 19 (FIG. 2) closed in a substantially sealed manner by a plug 20 provided with an axial bore traversed by the wire 3. This sleeve is fitted with a connector 21 arranged for connection by a suitable tube either to a source of inert gas in order to purge the inner bore of the glass tube 2, or to an exhauster in order to attain a predetermined suction inside the bore.

Figure 3:
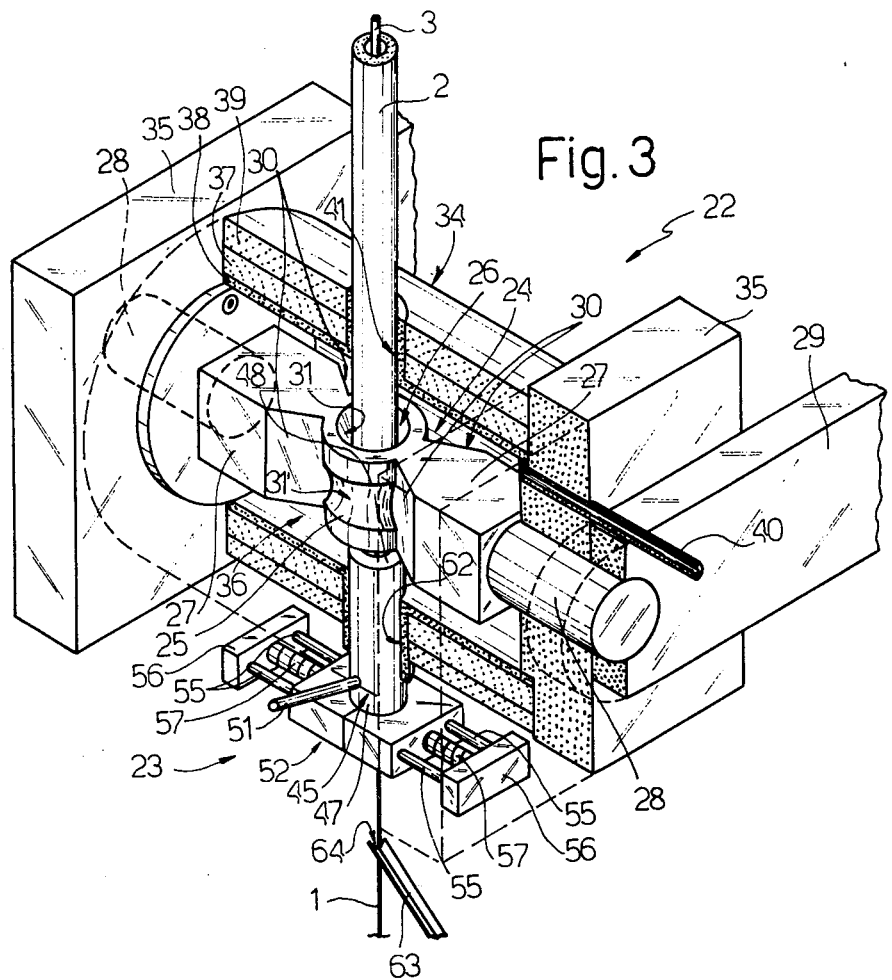
FIG. 3 is a partly sectional perspective view of that part of the apparatus comprising the heating and cooling means for the glass tube and metal wire disposed in it.
Figure 4:
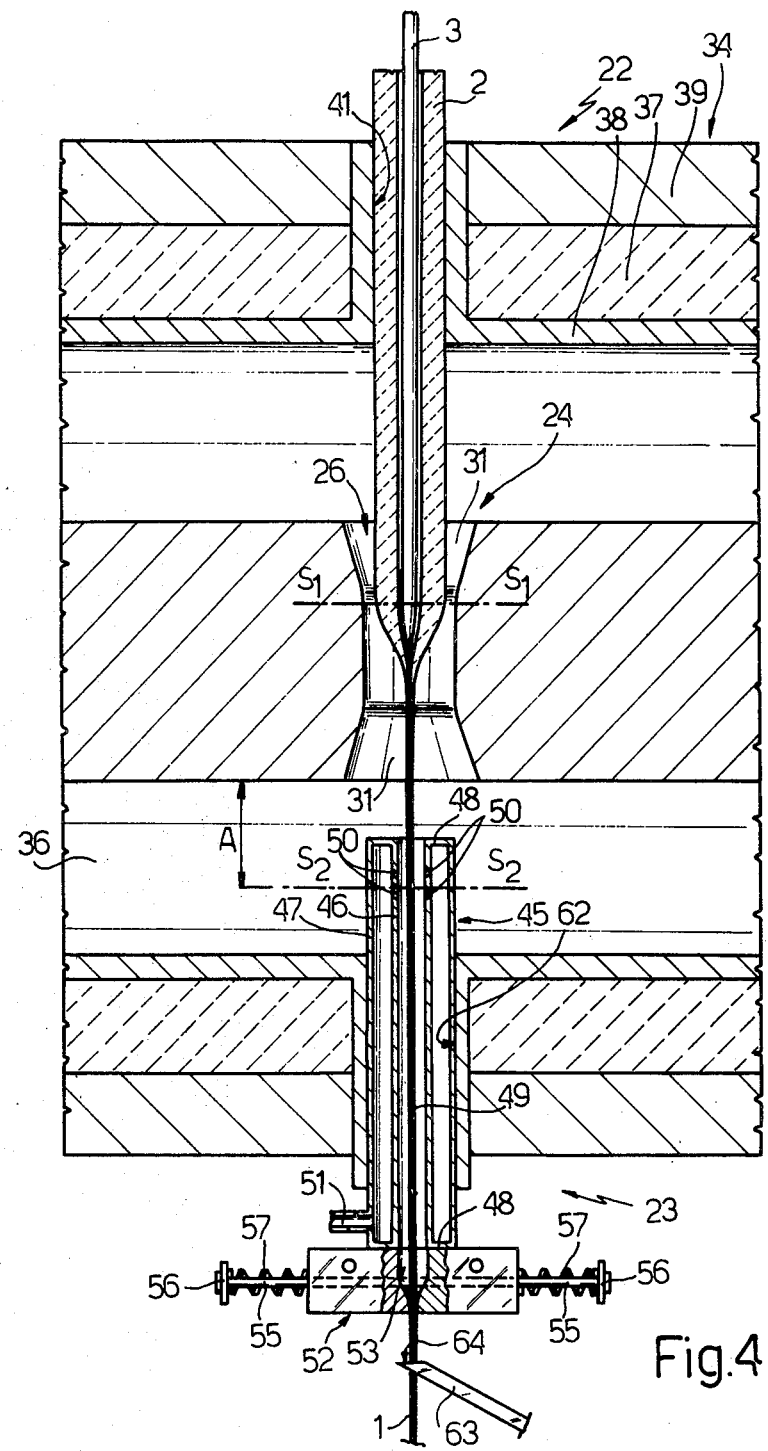
FIG. 4 is a longitudinal section through the heating and cooling means shown in the preceding figure.

The apparatus also comprises heating means and cooling means indicated overall by 22 and 23 respectively (FIGS. 1, 3 and 4). The first means comprise substantially an electrical resistor 24 (FIGS. 3, 5 and 6) which is provided with a central sleeve-shaped part 25 through the inner bore 26 of which is fed the glass tube 2, and a pair of arms 27 substantially orthogonal to said part and projecting therefrom on opposite sides. Each of these arms is arranged for connection, at its end 28, to a corresponding water-cooled resistor holder 29 supplied by a source of electricity.

Figure 5:
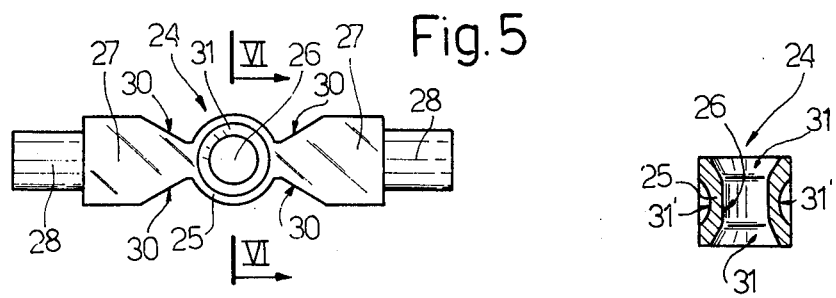
FIGS. 5 and 6 are views in plan and section (taken on the line VI—VI of FIG. 5) respectively, of the resistor which forms part of the heating means shown in FIGS. 3 and 4.
Figure 6:
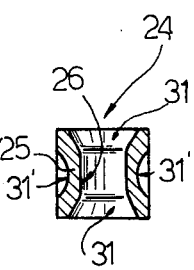

The cross-section of each of the arms 27 reduces gradually from the end 28 towards the central sleeve-shaped portion 25, in order to obtain a current density in the arm which tends to increase towards said central part, in the manner described hereinafter. Conveniently, each of said arms has a substantially rectangular cross-section, and the dimensions of this section are constant over a first arm portion located towards the end 27, and reduce substantially linearly over the remaining portion. In the embodiment shown, said reduction in cross-section is obtained by means of a pair of substantially convergent plane surfaces 30 (FIG. 5). As shown clearly in the section of FIG. 6, the diameter of the bore 26 in the central sleeve-shaped portion 25 tends to increase towards the outside, because of the presence of the conical end flared portions 31. An annular groove 31' is provided in the outer surface of the central sleeve-shaped portion 25.

The material of the resistor 24 can be any material which becomes hot by circulating electric current through it (Joule effect). It has however been found that particularly favourable results for the purposes of the invention are obtained by constructing the resistor of graphite, and this material must therefore be considered preferred.

The heating means 22 also comprise a preferably cylindrical casing 34 (FIG. 3) which with a pair of end plates 35 forms a substantially sealed chamber 36 in which the resistor 24 is disposed in a central position. This casing conveniently comprises a plurality of layers of different material, the central layer 37 being substantially for mechanical strength, the inner layer 38 being for thermal resistance, and the external layer 39 being for thermal insulation.

The chamber 36 can be connected, for example by a conduit 40, to any environment external to the chamber in order to provide a controlled atmosphere therein. The casing 34 is also provided with an upper bore 41 traversed by the glass tube 2 (FIG. 3) and an inspection aperture 42 (FIG. 1) closed by a transparent wall and arranged to enable the interior of the casing to be viewed directly.

The cooling means 23, represented in section in FIG. 4, comprise substantially a chamber of annular cross-section 45 coaxial to the axis of the bore 26 in the resistor 24 and formed substantially from an inner tubular element 46 and an outer tubular element 47 connected together by a pair of annular end walls 48. The inner annular element 46, which is arranged to be traversed longitudinally by the wire under formation 49, comprises bores 50 which communicate with the chamber 45 and are disposed substantially in radial formation. At least two sets of bores are conveniently present, and the axis of each of them forms an angle of less than 90° with the longitudinal axis of the tubular elements 46 and 47, as can be clearly seen in FIG. 4. The chamber 45 is also connected by a connector 51 to a source of suitable cooling fluid, for example water, which is fed at a predetermined pressure into the chamber so that it leaves at such a rate from the bores 50 as to generate jets, each of which is directed substantially against the wire under formation 49 and in the wire feed direction.

The inner bore of the tubular element 46 is closed lowerly by a plate 52, in which there is provided a further bore 53 coaxial to the preceding, and having a diameter which reduces gradually from that of the preceding bore to a diameter of 1-2 mm. Discharge bores (not shown) are also provided in this plate to enable the fluid to leave the bore of the tubular element 46 by suction. A suitable force is exerted on the wire portion leaving the cooling means by traction means, of which only a spool 54 is shown in FIG. 1 on to which the wire is wound. The traction speed of the wire can be adjusted in a required manner in order to attain a required cooling rate for the wire.

For the purposes described hereinafter, the plate 52 is conveniently constituted by two parts separated substantially along a vertical plane containing the axis of the wire under formation 49, and each of which is mobile relative to the other in a direction orthogonal to this axis. The two said parts are guided by a pair of columns 55 (FIG. 3) of a frame 56, and are returned to their closed position of FIG. 4 by spiral springs 57.

The apparatus also comprises means for rigorously adjusting the axial position of the cooling means 23 relative to the heating means 22. These are substantially formed by means of a sliding coupling between the outer surface of the tubular element 47 (FIG. 4) and a lower bore 62 provided in the casing 34 and substantially coaxial to the other bore 41 provided in the top of the casing. This coupling obviously enables the cooling means 23 to be moved relative to the heating means 22 in the direction of the wire under formation 49, thus enabling substantially the axial distance (indicated by A in FIG. 4) between the bores 50 (and thus the jets of cooling fluid generated thereby) and the resistor 24 to be adjusted. Other members and means, not shown, can be provided in order to accurately adjust this relative positioning.

Downstream of the cooling means 23 there is conveniently disposed a spout 63, the substantially V-shaped end edge 64 of which is held in contact with the wire 49 leaving the cooling means 23 as shown in FIGS. 3 and 1. This spout substantially forms a channel for collecting the fluid which still wets the wire, and for conveying it to suitable collection means 65 (FIG. 1).

The method of the invention is carried out in the following manner, using the apparatus described.

A glass tube 2 is mounted on the first feed means 4 in the manner shown in FIG. 1, and is locked in the tubular element 11 (FIG. 2), and a metal wire 3 of suitable dimensions is disposed inside said tube and between the pair of entrainment rollers 17 of the second feed means 16. These means can be driven such as to provide speeds of movement to the tube 2 and wire 3 which are in a predetermined ratio, in order to feed them to the heating means 22 and cooling means 23 at predetermined speeds. An inert gas is fed through the connector 21 into the gap of annular cross-section between the tube 2 and wire 3 in order to purge said gap.

The electricity source is fed to the electrode holder 29 (FIG. 3) and thus to the resistor 24 in order to heat it. This latter is able to generate very high temperatures inside the bore 26, which are sufficient to determine both the softening of the glass tube 2 to the required working viscosity and the melting of the metal wire 3 disposed in it, as these traverse said bore. Said heating can be carried out in a controlled atmosphere by feeding a gas or gas mixture to the chamber 36.

At the same time, the glass tube is fed by means of the geared motor 10 which rotates the screw 8, which in its turn causes the axial movement of the nut screw 9 and thus of the support frame 5 which is rigid with it. In contrast, the wire 3 is fed by the action of the entrainment rollers 17 which exert predetermined pressures on it in order to apply tangential forces to the wire sufficient for its feed.

While the tube 2 and wire 3 are being fed, a slight suction can conveniently be applied to the gap of annular cross-section between them in order to remove the gas which forms during the course of the process.

During the heating stage the cross-sections of the tube and wire are reduced as can be seen in the central part of FIG. 4, and if a predetermined traction is exerted on the free end of the wire which thus forms, a metal wire 49 of very small dimensions coated with a thin layer of glass is generated continuously due to the softening of the tube and the melting of the metal wire. Examining the formation stage of the wire 49 when the method is under proper operation, it will be noted that under the combined action of the axial force (exerted on the wire under formation by the traction means provided in the apparatus), the cross-sections of the tube and wire tend to reduce gradually in accordance with a profile of the type shown in FIG. 4. The wire 49 which thus forms through the bore in the internal tubular element 46 of the cooling means 22 is made to leave from the bore 53 in the plate 52 of said means, to then wind on the spool 54 which forms part of the said traction means. Jets of cooling fluid, for example water, flowing from the bores 50 in the inner tubular element 46 are directed on to the wire 49 traversing said cooling means. A continuous circulation of said fluid is created by feeding it firstly through the connector 51 and into the chamber of annular cross-section 45, and then after it has been in contact with the wire under formation 49 drawing it from the relative discharge bores (not shown) provided in the plate 52.

As stated, the axial position of the cooling means 23 can be adjusted relative to the heating means 22 by axially adjusting the outer tubular element 47 of the first means relative to the bore 62 provided in the casing 34 of the second means, for the purpose described hereinafter.

Figure 7:
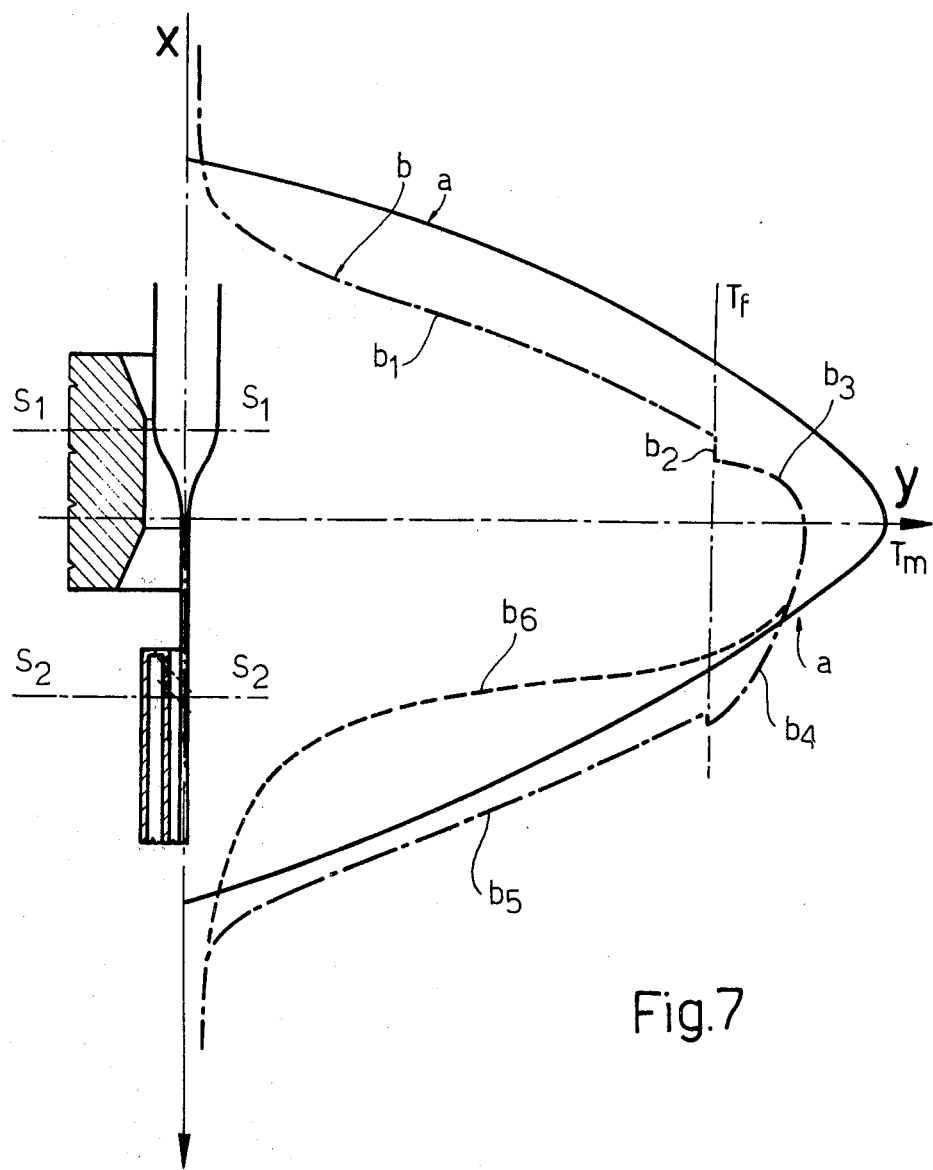
FIG. 7 shows some diagrams for illustrating the temperature distribution along the axis of the wire under formation, these temperatures being generated by said heating means, and the variation in the temperature of the wire itself as it passes through the heating and cooling means, under different operating conditions.

The temperature which the resistor 24 is able to generate inside its bore 26 and along the axis of this latter is distributed as shown by curve a of FIG. 7, in which x indicates the axis of said bore and y a plane orthogonal to said axis. Curve a, in which the temperatures T measured along the x axis are plotted along the y axis shows that the temperature T tends firstly to increase and then to decrease with a very high gradient (defined as the derivative dT/dx). This favourable property, which makes the described resistor particularly suitable for the objects of the invention, derives substantially from its shape and from the material with which it is constructed. In this respect, the reduction in cross-section of each arm 27 (FIG. 5) of the resistor towards the central sleeve-shaped portion 25 leads to a considerable increase in current density towards this portion, and thus induces high temperature gradients.

The temperature of the metal wire 3 traversing the resistor 24 and the subsequent cooling means 23 can be assumed to follow the shape indicated by curve b when measured along the x axis. Over the first portion $b_1$ of this curve, the temperature of the wire 3 obviously remains always below the temperature of the resistor indicated by curve a. When the wire temperature reaches the value $T_f$ corresponding to the melting point of the wire metal, there is a short curve portion $b_2$ substantially parallel to the x axis, at which the metal melts. Subsequently, the temperature of the wire (or of the molten metal) varies as the portion $b_3$, but without reaching the maximum temperature $T_m$ which the resistor would be able to generate along the x axis in the absence of the wire.

If the wire under formation 49 were to be cooled in air and thus without operating the cooling means 23, it could be assumed that this cooling would substantially follow the curve portions $b_4$, $b_5$, with the temperature $T_f$ being again reached at the end of the first of these (with consequent solidification of the wire), and the temperature during the second of these being always greater than the temperature which the resistor 24 would be able to generate at the same points along the x axis (curve a).

However, if the cooling means 23 are in operation, the jets leaving the bores 50 remove a considerable quantity of heat from the wire under formation 49, to determine very rapid cooling of the wire material, with the result that under these conditions the cooling must be considered to follow the shape represented by the curve portion $b_6$. The solidification temperature $T_f$ is in this case immediately reached in the first part of said portion.

It is therefore apparent that two well defined sections, which are of considerable importance in examining the phenomena which occur during the course of the method, can be identified along the x axis of the wire under formation 49. The first, indicated by $S_1$ in FIGS. 4 and 7, corresponds to the limiting section, downstream of which begins the reduction in the cross-section of the glass tube 2, and is positioned approximately at the terminal part of portion $b_1$ (FIG. 7) of curve b. Downstream of said section, the diameter of the various cross-sections of the wire under formation gradually reduces in accordance with a profile shown in FIG. 4, which obviously depends on the physical-chemical characteristics of the tube and wire materials. The second limiting section, indicated by $S_2$ in the figures, corresponds to that beyond which there is no further reduction in the cross-section of the wire under formation.

Thus the phenomenon of gradual reduction in the cross-section of the wire under formation, also known as "attenuation", takes place only between the limiting sections $S_1$ and $S_2$. As is well known, this phenomenon occurs in any jet of material having a predetermined viscosity, and in particular in a fluid column such as that under examination to which a traction of predetermined value is applied. That portion of wire under formation which lies between the sections $S_1$ and $S_2$ therefore has variable cross-sections along its axis, whereas the portions located upstream and downstream of said sections are of constant cross-section.

According to the method of the invention, the cooling means 23 (FIG. 4) are positioned, with respect to the heating means 22, at such a location along the x axis of the wire under formation that the metal material of the wire solidifies in a section which lies not before the limiting section $S_2$ at which the reduction in cross-section of the wire terminates. In this respect, it has been found that if this condition is satisfied, the wire thus obtained has particularly good mechanical characteristics, and can be produced continuously and practically without defects. Furthermore, according to the invention, the quantity of heat removed by said cooling means must be sufficiently high to prevent softening of the glass covering the wire under formation downstream of the section $S_2$. This second condition is of particular importance, because as is well known if the solidification temperature of the metal and glass is reached during the cooling of the wire under formation 49, the heat of solidification released by virtue of the change of state would tend to soften the glass coating of the wire, with the consequence of giving rise to defects in the wire under formation, or even its breakage.

The two said conditions from which the characteristics both of the method and of the wire obtained by the method depend, can be satisfied with the described apparatus in a very simple manner. The first condition can be satisfied by axially moving the tubular element 47 of the cooling means 23 inside the corresponding bore 62 of the casing 34, and thus adjusting the position of the bores 50 (and thus the jets obtained) relative to the wire under formation, until the section at which the metal material of the wire solidifies coincides with the limiting section $S_2$ at the termination of attenuation, or is immediately below it. By virtue of said relative movement, the shape of the portion $b_6$ (FIG. 7) of curve b varies, and thus the position of the section at which solidification of the metal material of the wire begins varies along the x axis of the wire under formation.

The second said condition is satisfied by the high cooling action of the liquid brought into contact with the outer surface of the wire in the zone at the end of attenuation, this being determined by the liquid throughput and the very small dimensions of the cooling zone. These results are obtained because of the formation of jets directed against the wire under formation, and in particular because of their inclination to the axis of the wire, which enables the cooling means 23 to be disposed very close to the resistor 24. By suitably choosing the number of jets, it is possible to obtain a cooling which is sufficiently efficient as to prevent any softening of the glass coating of the wire downstream of the section $S_2$.

The wire which leaves the bore 53 in the plate 52 of the cooling means 23 is still wet. The water can be removed from its surface by means of the edge 64 of the spout 63 which slides over said surface.

The two parts of the plate 52 can be moved relative to each other by sliding them along the relative columns 55 (FIG. 3) and overcoming the reaction of the springs 57. In this manner, it is possible to obtain complete accessibility to the bore in the inner tubular element 46, for example when at the beginning of the process the free end of the wire under formation has to be pulled with a tool before connecting it to the traction means.

The described method has continuously produced metal wires in particular of stainless steel, having a very small diameter of the order of a thousandth of a millimeter and with very favourable characteristics, in particular with excellent mechanical characteristics, good electrical and thermal conductivity, and high corrosion resistance. Moreover, the metal wires of special alloys produced by the method have shown a "vitreous" structure, i.e. a substantially non-crystalline structure very different from the crystalline structure which metals normally have. This vitreous state is obtained because of the high cooling rate at which the wire under formation is cooled. In this respect, in the method of the invention, cooling rates of the order of $10^{6°}$ C./sec. have been encountered, these being much higher than those obtainable in previous methods, which generally do not exceed $10^{4°}$ C./sec. Such a high cooling rate is obtained because of the special described manner in which the wire under formation is cooled.

It is apparent that modifications can be made to the stages of the method and to the parts of the apparatus as described for the present invention, without leaving the scope of the inventive idea.

What we claim is:

1. A method for continuously producing very small diameter metal wire from molten material, comprising at least one heating stage for heating in a first predetermined position a glass tube in which a wire of metal material is disposed, these being fed in the direction of their longitudinal axis in such a manner as to cause said glass to soften to a required viscosity and said material to melt in order to form a wire, and a cooling stage for cooling, in a second predetermined position, said wire on which a required traction is exerted, characterised in that said second predetermined position in which said wire cooling stage is carried out is located, with respect to said first position, in such a location along the wire axis that solidification of said material takes place in a section situated not before the limiting section at which the reduction in cross-section of said wire terminates, the quantity of heat removed during said cooling stage being sufficiently high to prevent softening of the glass of said tube downstream of said limiting section.

2. A method as claimed in claim 1, characterised in that said quantity of heat removed during said cooling stage is sufficiently high to obtain a cooling rate of the order of $10^{6°}$ C./sec.

3. A method as claimed in claim 1, characterised in that said first and second stages are carried out in a chamber with a controlled atmosphere.

4. A method as claimed in claim 1, characterised in that said heating stage is carried out by means of an electrical resistor provided with a central sleeve through the inner bore of which said tube is fed, and a pair of arms substantially orthogonal to said sleeve and projecting from it on opposite sides, each of said arms being arranged to be connected, at its free end, to a corresponding electrode of a source of electricity, the cross-section of each of said arms reducing gradually from said free end towards said sleeve in order to obtain a current density in the arm which tends to increase towards said sleeve, and thus a high temperature increase in the tube and in the wire along said longitudinal axis.

5. A method as claimed in claim 4, characterised in that each of said arms is of substantially rectangular cross-section, the dimensions of said cross-section remaining constant along a first arm portion located towards said free end of the arm, and reducing over the remaining portion of said arm.

6. A method as claimed in claim 4, characterised in that said resistor is of graphite.

7. A method as claimed in claim 1, characterised in that said second cooling stage is carried out by directing a plurality of jets of a cooling liquid on to said wire under formation which is located in said second position, each jet being directed both towards the wire under formation and in the wire feed direction.

8. A method as claimed in claim 7, characterised in that each of said jets forms substantially an angle of 45° to said wire feed direction, such that said jets also exert a suction effect between said chamber and the outside.

9. A method as claimed in claim 7, characterised in that said jets are disposed radially about said wire under formation.

10. A method as claimed in claim 1, characterised by comprising a stage in which an inert gas is fed into the gap between said wire and said tube which lie upstream of said first position.

11. A method as claimed in claim 1, characterised in that said tube and said wire are fed in the direction of their axis at different speeds.

12. An apparatus for continuously producing very small diameter metal wire from molten material, comprising heating means for heating in a first predetermined position a glass tube in which a wire of metal material is disposed, these being fed in the direction of their longitudinal axis, said heating means being arranged to cause said glass to soften to a required viscosity and said material to melt in order to form a wire, cooling means for cooling said wire and means for exerting a predetermined traction on the wire, characterised by comprising means for adjusting the relative position of said heating means to said cooling means along the axis of the wire under formation in such a manner that solidification of said material takes place in a section, along the axis of said wire, which is situated not before the limiting section at which the reduction in cross-section of said wire terminates, said cooling means being arranged to remove a quantity of heat which is sufficiently high to prevent softening of the glass of said tube downstream of said limiting section.

13. An apparatus as claimed in claim 12, characterised by comprising a controlled atmosphere chamber for containing said tube under formation and at least part of said heating and cooling means.

14. An apparatus as claimed in claim 12, characterised in that said heating means comprise an electrical resistor provided with a central sleeve through the bore of which said tube is fed, and a pair of arms substantially orthogonal to said sleeve and projecting from it on opposite sides, each of said arms being arranged to be connected at its free end to a corresponding electrode of a source of electricity, the cross-section of each of said arms reducing gradually from said free end towards said sleeve, in order to obtain a current density in the arm which tends to increase towards said sleeve, and thus a high temperature increase in the tube and in the wire along said longitudinal axis.

15. An apparatus as claimed in claim 14, characterised in that each of said arms has a substantially rectangular cross-section, the dimensions of said cross-section being constant in a first arm portion located towards said free end of the arm, and reducing over the remaining portion of said arm.

16. An apparatus as claimed in claim 15, characterised in that said resistor is of graphite.

17. An apparatus as claimed in claim 12, characterised in that said cooling means comprise at least one jet of cooling fluid directed on to said wire under formation located in said second position, said jet being directed both towards said wire and towards the wire feed direction.

18. An apparatus as claimed in claim 17, characterised in that said jet forms substantially an angle of 45° to said wire feed direction in order to exert a suction effect between said chamber and the outside.

19. An apparatus as claimed in claim 17, characterised in that said jets are disposed radially about said wire formation.

20. An apparatus as claimed in claim 17, characterised in that said cooling means comprise substantially a chamber of annular cross-section defined between a pair of tubular elements, said wire under formation axially traversing the bore in the more inner tubular element of said chamber, said bores for said jets in communication with said chamber being provided in said more inner tubular element, and said pressurised fluid being fed into said chamber.

21. An apparatus as claimed in claim 20, characterised in that said chamber is closed lowerly by a wall in which a bore is provided coaxial to the inner bore of said more inner tubular element, and having a diameter which decreases gradually substantially from the diameter of the more inner tubular element to the diameter of said wire, said bore being in communication with a further discharge bore which enables said fluid sprayed by said jets to leave through it.

22. An apparatus as claimed in claim 21, characterised in that said base wall is in two parts, of which at least one is mobile relative to the other, said two parts being separated substantially along a plane containing the axis of said wire under formation.

23. An apparatus as claimed in claim 20, characterised in that below said base wall there is disposed a sliding element held in contact with the wire leaving said bore of said base wall, in such a manner that the fluid still present on said wire at the outlet of said bore is transferred on to said element, and is conveyed thereby to collection means.

24. An apparatus as claimed in claim 12, characterised by comprising exhauster means for exhausting air from the gap between said wire and said tube upstream of said first position, said means comprising a first tubular element, into the inner bore of which there is inserted the upper end of said glass tube, and in the upper end of which there is provided a bore for the passage of said wire, said tubular element being provided with a connector through which an inert gas is fed into the tubular element.

25. An apparatus as claimed in claim 12, characterised by comprising first feed means for said tube arranged to move it axially at a first predetermined speed, and second feed means for said wire arranged to move said wire axially in said tube at a second predetermined speed, said feed means being arranged for operation at speeds which are in a predetermined ratio to each other.

* * * * *